(12) United States Patent
Baker et al.

(10) Patent No.: US 8,503,769 B2
(45) Date of Patent: Aug. 6, 2013

(54) MATCHING TEXT TO IMAGES

(75) Inventors: Simon Baker, Los Altos Hills, CA (US);
Dahua Lin, Cambridge, MA (US);
Anitha Kannan, Mountain View, CA
(US); Qifa Ke, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 12/979,375

(22) Filed: Dec. 28, 2010

(65) Prior Publication Data

US 2012/0163707 A1    Jun. 28, 2012

(51) Int. Cl.
*G06K 9/62* (2006.01)
*G06F 17/00* (2006.01)

(52) U.S. Cl.
USPC .......................... 382/159; 382/224; 715/234

(58) Field of Classification Search
USPC ............... 382/159, 217, 176, 310, 229, 174,
382/178, 180, 171, 226, 177, 224; 715/202,
715/210, 209, 205, 234, 854, 757; 704/270;
345/419, 473, 420; 707/E17.008, E17.013,
707/999.01, E17.009, 956, E17.01, E17.037,
707/999.107, 999.104, E17.005, 999.005,
707/E17.108, 785, 918, E17.012, 999.2, 704
See application file for complete search history.

(56) References Cited

U.S. PATENT DOCUMENTS

| | | | |
|---|---|---|---|
| 5,889,886 A * | 3/1999 | Mahoney | 382/176 |
| 7,065,520 B2 | 6/2006 | Langford | |
| 7,543,758 B2 * | 6/2009 | Dymetman et al. | 235/494 |
| 8,107,929 B2 * | 1/2012 | Citrin et al. | 455/414.1 |
| 2005/0246623 A1 | 11/2005 | Ma et al. | |
| 2007/0162842 A1 | 7/2007 | Ambachtsheer et al. | |
| 2008/0152238 A1 | 6/2008 | Sarkar | |
| 2009/0016615 A1 * | 1/2009 | Hull et al. | 382/217 |
| 2009/0177959 A1 * | 7/2009 | Chakrabarti et al. | 715/234 |
| 2010/0073398 A1 | 3/2010 | Fisher et al. | |

OTHER PUBLICATIONS

Fan, et al., "Photo-to-Search: Using Multimodal Queries to Search the Web from Mobile Devices", Retrieved at <<http://ir.shetac.uk/xin/Papers/MIR2005_Photo-to-Search%20Using%20Multimodal%20Queriee%20to%20Search%20the%20Web%20from%20Mobile%20Devices.pdf >>, Nov. 11, 2005, Pages 8.

Shih, et al., "Using URLs and Table Layout for Web Classification Tasks", Retrieved at <<http://citeseerx.ist.psu.edu/viewdoc/download?doi=10.1.1.2.2981&rep=rep1&type=pdf >>, May 22, 2004, Pages 10.

Wang, et al., "ARISTA—Image Search to Annotation on Billions of Web Photos", Retrieved at <<http://research.microsoft.com/en-us/people/xjwang/cvpr10_paper301_arista_final.pdf>>, 2010, Pages 8.

* cited by examiner

*Primary Examiner* — Sheela Chawan

(57) ABSTRACT

Text in web pages or other text documents may be classified based on the images or other objects within the webpage. A system for identifying and classifying text related to an object may identify one or more web pages containing the image or similar images, determine topics from the text of the document, and develop a set of training phrases for a classifier. The classifier may be trained and then used to analyze the text in the documents. The training set may include both positive examples and negative examples of text taken from the set of documents. A positive example may include captions or other elements directly associated with the object, while negative examples may include text taken from the documents, but from a large distance from the object. In some cases, the system may iterate on the classification process to refine the results.

20 Claims, 2 Drawing Sheets

MATCHING TEXT TO IMAGES

BACKGROUND

Web pages often have images and text, but it can be difficult to determine information about the images from the web page. Image information may be used, for example, for indexing the images or the web pages.

SUMMARY

Text in web pages or other text documents may be classified based on the images or other objects within the webpage. A system for identifying and classifying text related to an object may identify one or more web pages containing the image or similar images, determine topics from the text of the document, and develop a set of training phrases for a classifier. The classifier may be trained and then used to analyze the text in the documents. The training set may include both positive examples and negative examples of text taken from the set of documents. A positive example may include captions or other elements directly associated with the object, while negative examples may include text taken from the documents, but from a large distance from the object. In some cases, the system may iterate on the classification process to refine the results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
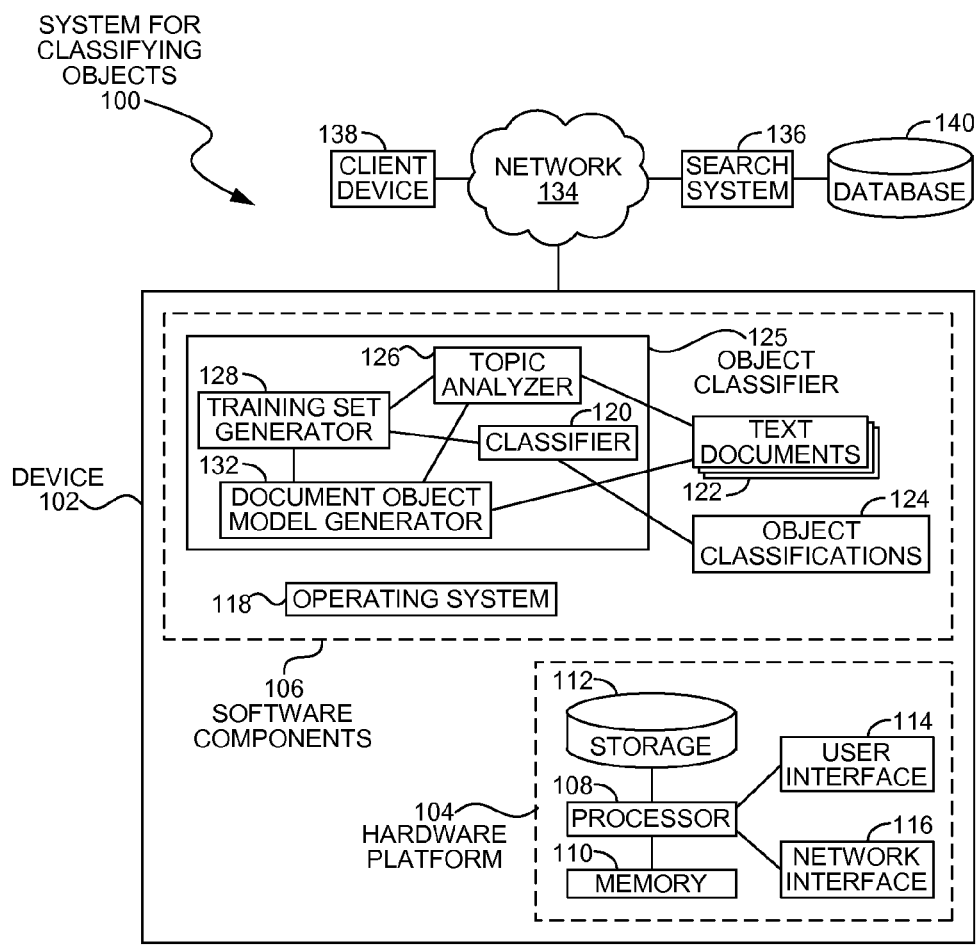
FIG. 1 is a diagram illustration of an embodiment showing a system for classifying objects embedded in text files.

A classification and identification system for images may determine information about an image or other text document object based on the object's proximity to text. In general, text that is near the object may be more relevant to the image or other object than other text. A classifier may be trained using both positive and negative examples of text found in the documents, then used to classify all of the text in the documents. The significant text portions may be text used to describe the image or other object.

The classification and identification system may operate over several different text documents that share the same image or object. One use scenario may be to classify objects contained in a group of web pages. When multiple text documents with the same objects are available, the classification system may aggregate all of the information associated with the object to identify text that may be associated with the object.

The classifier may use both positive and negative examples to train or learn the classifier. The positive examples may include text that is directly associated with the image, such as captions for the image. A negative example may be text that is located 'far away' from the image, and also which may be dissimilar to the positive examples. Such text may be irrelevant to the image and may train the classifier to reject those portions of the text documents that are not related to the image, both those far away and close to the image Throughout this specification and claims, the classification and identification system may be used to identify text related to images within documents such as web pages. Similar systems may be used to identify text related to any type of object within a web page or other text document, including metadata, audio clips, video clips, animations, or other objects. The system may reason about the object without analyzing the object itself, and may infer information about the object merely from the position of the object with respect to text in the web page, and the co-occurrence of the object within multiple documents. While an image object may be used as an example for an object processed by the classification system, other objects may also be processed in various embodiments.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which cart be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may classify objects that may be embedded in text documents. Embodiment 100 is a simplified example of a computer system that may receive one or more text documents, identify text related to images or other objects in the documents, and classify the text related to objects based on text that is in proximity to the objects.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may classify text related to objects from text documents, where the object's classification may be determined from text associated with the objects or located near the objects. In a typical example, images may be incorporated into web pages. The system may be able to reason about and classify the text related to the images based solely on the text associated with the images and text located near the images. The system may also compare multiple web pages that have the image to gather information about the image.

The text related to an image or object may be classified without actually inspecting or analyzing the object itself. In many cases, the object may have captions or other text that may be related to the object. Additionally, text located near the object may be closely associated with the image. Other text that may be located far away from the object may be negatively associated with the object. By gathering both positive and negative examples of associated text, a classifier may be trained and used to analyze all of the text in the documents. The classifier may identify text chunks that are associated with the object and those chunks may be used to classify or describe the object.

In a typical use scenario, the classification system may be used to identify and describe images within web pages. Other use scenarios may include analyzing various audio, video, animations, tags, metadata, or other objects that may be embedded in web pages, word processing documents, books, papers, brochures, or other text based documents.

In a web page scenario, the classification system may classify images for a search system. In such a use scenario, the classification system may analyze images across multiple web sites and generate keywords or other index information about images so that future searches may identify images based on keywords or other text input. In such a use scenario, the classification system may analyze images across the entire World Wide Web to build indexes from which future searches may be performed.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include an object classifier 125 that may receive various text documents 122 and generate object classification 124 for various objects located in the text documents 122.

The object classifier 125 may have several components that may perform various steps in a classification process.

A topic analyzer 125 may process each of the text documents 122 to identify text chunks within the documents, and then classify the text chunks into topics. The topic may be predefined and may be part of a hierarchical taxonomy of topics. Some embodiments may use topics rather than individual words or phrases for analysis because the number of topics may be much smaller than the number of possible words or phrases. This property of topics may make the classification analysis more robust and effective in some embodiments.

A document object model generator 132 may analyze the text documents 122 and may generate a model that describes the text document structure. The model may define various nodes for components or objects within the text document and how those objects may be related. In a web page, for example, the various objects may be tags, section definitions, paragraphs, images, interactive buttons, headers, footers, and other components of a Hyper Text Markup Language (HTML) document.

In a typical HTML document, there may be many tens or even hundreds of objects within a single web page. Many web pages may have various navigational tools, links, or other components, as well as sections of the document such as sidebars, menus, or the like, each of which may be defined as a separate object within the document object model. The document object model may represent objects within the document as nodes within a hierarchical structure, although other document object models may have other mechanisms for representing the document.

A document object model may be used to identify text that may be 'near' or 'far' from the object to the analyzed. In the example of an image object within a web page, text such as captions associated with the image or other text that is located directly next to the image may be highly relevant to the image, while text such as navigational tools that are located many nodes away from the image may not be as relevant.

A training set generator 128 may identify both positive and negative examples that may be used to train a classifier 120. The classifier 120 may then analyze all of the text documents 122 and identify those text portions that may be relevant or not relevant to the analyzed object.

The training set generator 128 may identify portions of the text documents that may be positive examples of the analyzed object by finding text portions or their associated topics that are associated with the object. For example, objects that may have captions, alternative text, descriptors, tags, paragraphs, or other directly associated information may be considered as positive examples. Additionally, text that is located next to the object may be considered a positive example.

The examples, both positive and negative, may affect how the classifier 120 identifies relevant text. Positive examples may match the relevant text while negative examples may not match the relevant text. Negative examples may be collected from the same text documents as positive examples, and may assist the classifier 120 in removing less relevant text to properly classify an object.

The training set generator 128 may identify negative examples from text located far away from the image. The notion of 'near' and 'far' that may be used to identify positive and negative examples may be determined by traversing a document object model. Objects that are at a node next to the object may be considered 'near', while objects located many nodes away may be considered 'far'. Many embodiments may have a predefined number of nodes that may be used to define 'near' and 'far'.

For example, objects within one or two, or even five nodes of a document object model may be considered 'near' and may be selected as positive examples. Objects that may be located 20 or 30 nodes away may be considered 'far' and may be used as negative examples. Objects that may be between two nodes and 20 nodes away may or may not be used as examples and may be classified by the classifier 120 after training.

In some embodiments, the notion of 'near' and 'far' may be determined by physical proximity in the document when the document may be rendered for presentation. In such embodiments, the text document may be analyzed to identify objects physically close on a laid out representation of the document as positive examples, and objects that are physically far away as being negative examples. Such embodiments may analyze a text document in terms of the document's physical layout properties as opposed to a document object model that may analyze the relationships between document objects. Some embodiments may use both a physical proximity analysis and document object model analysis to identify either or both of the positive or negative examples.

Both the positive and negative examples may assist the classifier 120 in identifying the most relevant text from the text document. In some cases, the negative examples may be somewhat related to the image but still may assist in classifying the text to find the most relevant text for the image.

For example, an entire web page may be related to the sport of basketball, and an analyzed image may have a famous basketball player making a critical shot at the end of a playoff game. A typical embodiment may identify some of the content far from the image as being negative examples of the image, and those negative examples may include text that may still be at least somewhat relevant to the image. However, the negative examples may help the classifier 120 to select text that is more specific and more relevant when analyzing all of the text in the document.

The object classifier 128 may analyze multiple text documents 122 that may contain an object to analyze. For example, the text documents 122 may include many web pages that may include the same image. The object classifier 128 may return more relevant classifications when the same object is analyzed in many different contexts. For example, a single image may be used in many different web pages and many different contexts. With a broad usage, the object classifier 128 may be able to classify the image with more accuracy than if the image were used in one or two web pages.

In some embodiments, "similar" objects may be grouped together for classification. For example, an image may be present in several different web pages, but the images may be cropped, have different aspect ratios, may be edited, or have some other differences. The differences may be analyzed to determine whether or not the images may be considered "similar". If the images are similar, the web pages may be grouped together for analysis.

When selecting both positive and negative examples, a training set generator 128 may have various heuristics or functions that may remove noisy or irrelevant examples. For example, images in a web page may have automatically generated captions, such as "image0001" or other descriptors. In such cases, the captions may not be considered good positive examples, while a caption that may be more relevant may be "Hoover Dam During Construction". The heuristics may be tailored for specific types of documents, document description languages, or other conditions specific to a particular embodiment.

The text documents 122 may be any type of document that may have text associated with objects in the document. In a common embodiment, the text documents 122 may be web pages, although other embodiments may classify objects from word processing documents, portable document format (PDF) documents, presentation slides, spreadsheets, or any other type of document that may contain text and objects.

In some embodiments, an object classifier 125 may accept text documents 122 in many different formats. In such embodiments, each type of document format may be analyzed using analysis routines that may be specific to the type of document. In some such embodiments the documents may be converted to a common format and analyzed by the object classifier 125 from the common format.

The object classifications 124 may include the most relevant text found for the analyzed image. The most relevant text may be extracted from one or more text documents, and the relevant text may be useful for reasoning about the object. The relevant text may be used as classifications or indexes for a search system, for example.

In many embodiments, the device 102 may be connected to other devices through a network 134. The network 134 may be a local area network, wide area network, the Internet, or other network connection.

In some embodiments, an object classifier 125 may provide indexes or classifications for a search system 136 that may store indexes or classifications in a database 140. In such a use scenario, a user may search for a certain topic and the search system 136 may return images that relate to the topic.

The search system 136 may also be used to gather the text documents 122 that may include the object to be analyzed. When an object is identified to analyze, the object classifier 125 may send a search request to the search system 136, which may return a group of text documents 122 that may include the object.

The operations of the object classifier 125 may be performed in an automated fashion. In such embodiments, a crawler may find objects within text documents and cause the object classifier 125 to analyze the objects.

In another embodiment, the object classifier 125 may be executed at the request of a user on a client device 138. In such an embodiment, a user may select an object, such as an image on a web page, and request further information about the image from the object classifier 125. The object classifier 125 may execute the analysis and return object classifications 124.

Figure 2:
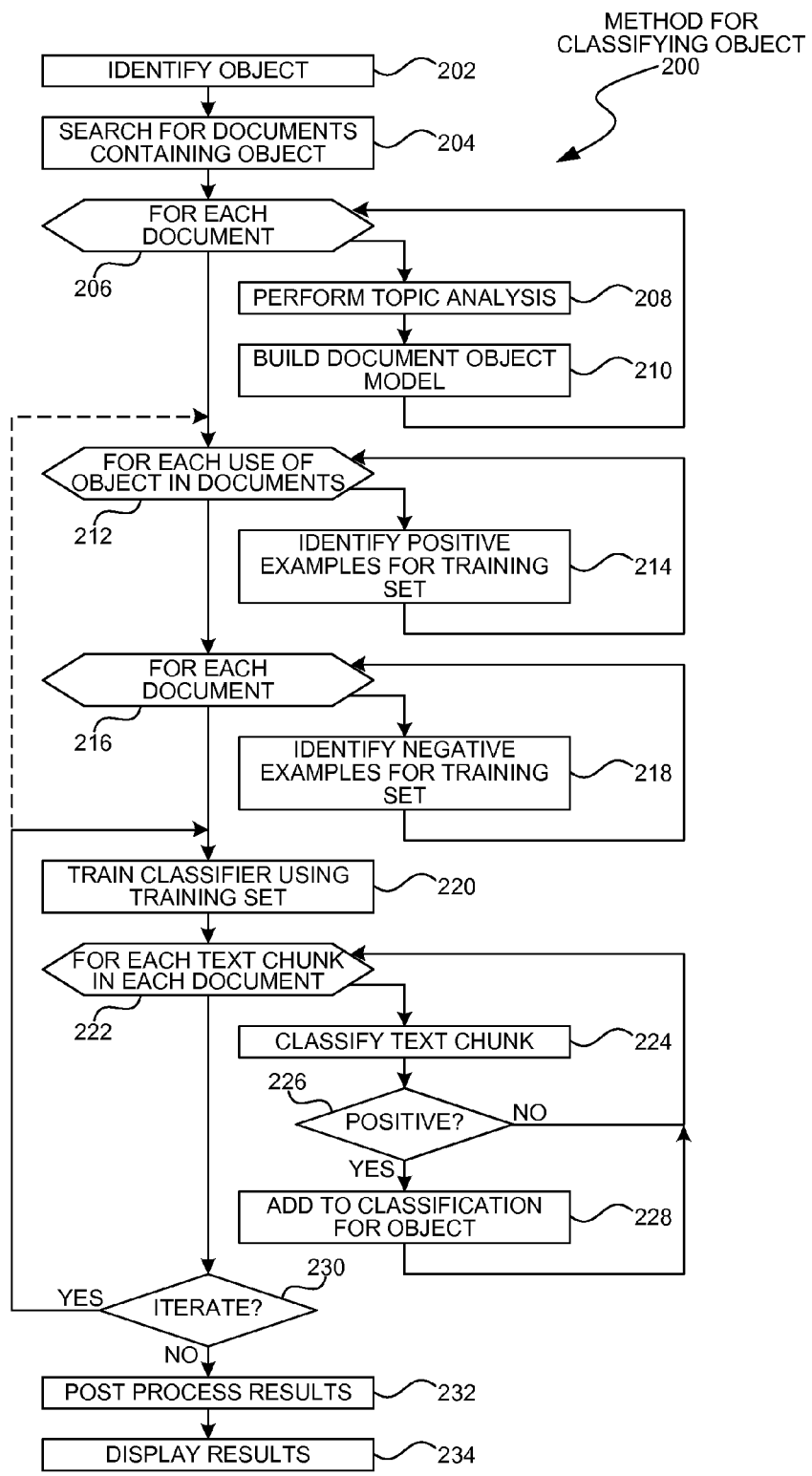
FIG. 2 is a flowchart illustration of an embodiment showing a method for classifying objects from a text file.

FIG. 2 is a flowchart illustration of an embodiment 200 showing a method for classifying objects. The process of embodiment 200 is a simplified example of one method that may be performed by an object classifier, such as the object classifier 125 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a simplified example of the steps that may be used to automatically classify an object based on text that may be related to or located nearby the object in a text document. In a typical use scenario, an image may be used in multiple web pages. By analyzing all of the web pages that contain the image, the image may be classified using the text of the various web pages. The results may be a group of text that may describe the image.

The object to be processed may be identified in block 202. The object may be any object in a text document, such as an image, video clip, audio clip, metadata, tag, or other object. In many embodiments, multiple objects may be processed at the same time. Such embodiments may have increased throughput than embodiment 200.

Documents that contain the object may be obtained in block 204. In some embodiments, the documents may be identified by a search. The search system may be a search system that may be capable of locating the same or similar images from multiple text documents. In some cases, such a search system may be a specialized search system for images.

in some cases, cached or stored copies of the documents may be used for the analysis of embodiment 200. In other cases, each of the documents may be retrieved from a storage location for analysis. In some embodiments, a group of documents may be crawled to identify matching objects from the documents.

Each document may be analyzed in block 206.

For each document, the text of the document may undergo topic analysis in block 208. Topic analysis may take text chunks from the document and classify the text chunks into a hierarchical or other organized group of topics. The topic analysis ma limit the scope of the text analysis to those topics within the topic hierarchy. This may allow the analysis to be more efficient.

The topic analysis may be performed by many different methods. In one embodiment, text chunks within the document may be compared to a hierarchical taxonomy of topics. Various taxonomies may be used, and some may be specialized taxonomies for certain fields of expertise. In some cases, a taxonomy may be a general purpose taxonomy that may cover large areas of the World Wide Web, for example.

In block 210, each document may have a document object model constructed. A document object model may define a relationship tree between the different portions of a document. Each type of document may have different types of document object models.

In many embodiments, the topics analyzed in block 208 may be mapped to the document object model created in block 210. In some embodiments, the document object model may be created before the topic analysis.

For example, a document described using HTML, XML, or other structured definition languages may have a model with objects or nodes representing different portions of the document, including various objects, tags, links, images, and other components of the document. In another example, a word processing document may have objects associated with different portions of the document, such as headings of various sections, headers and footers, captions, or other objects.

In block 212, each use of the object may be analyzed. The use of the object may be any time the object is used within the documents of block 206. In some cases, a single document may have two or more uses.

For each use of the object, positive examples of text may be identified in block 214. The positive examples may be text that is somehow directly related to the object. For instance, a caption for an image may be a positive example, as well as a tag, name, replacement text, or other text that may be directly related to the image.

In some embodiments, the topics generated in block 208 may be used as positive examples, while other embodiments may use the raw text. Some embodiments may use a combination of topics and text. Positive examples may be those text or topics that may have a positive correlation with the object.

Some embodiments may use various filters or heuristics to eliminate positive examples that may be noise. For example, a caption or replacement text for an image that is not descriptive may be removed as a positive example.

In some embodiments, positive examples may be taken by traversing a document object model to find text within some small number of nodes from the object. For example, a positive example may be taken from within a single node, two, three, four, five, or more nodes from the object. Each embodiment may have different criteria based on the type of document, the type of document object model, or other criteria.

For each document in block 216, negative examples may be gathered for a training set. Negative examples may be those examples that are less likely to be related to the object. Many embodiments may take negative examples from portions of the documents that are not directly related to the object.

In embodiments with a document object model, the object model may be traversed several nodes away from the object to locate negative examples. In some such embodiments, a document object model may be traversed 10, 20, 30, 40, 50 or more nodes away from the object before beginning to identify negative examples. Such negative examples may represent text that is 'far away' from the object and may therefore be considered to be less relevant.

When the negative examples are taken from the documents that contain the object, the negative examples may be somewhat related to the object. Such embodiments may be capable of a higher level of discernment between relevant and less relevant text within a document.

After creating all of the examples, a classifier may be trained using the training set in block 220. Different embodiments may have different classifiers, and some may use a binary classifier that may accept topics or text as an input, and then return a binary result of either related or not related.

In some embodiments, the classifier may be a multi-class classifier. A multi-class classifier may be capable of processing multiple objects at the same time.

In block 222, each text chunk in each document may be analyzed. Each text chunk may be classified using the classifier in block 224. If the result is not positive in block 226, the process may return to block 222. If the result is positive in block 226, the text chunk may be added to the classification of the object in block 228. In some embodiments, both positive and negatively classified text chunks may be added to the positive/negative sets.

In some embodiments, the text chunks analyzed in block 222 may be topics that may have resulted in the analysis of block 208.

After processing all of the text chunks in block 222, some embodiments may perform one or more iteration steps in block 230. In some embodiments, the positive and negative examples for the classifier may include the classification of each of the text chunks. In some embodiments, the newly classified text chunks may be used to re-train the classifier in block 220. In some embodiments, the newly classified chunks may be used to re-define the positive and negative examples by returning to block 212. In some embodiments, the classifier may generate a weighting or other non-binary output from the classification process. In such embodiments, the weighting may be fed back to learn in a new classifier.

After any iterations, the results may be post processed in block 232 and the results may be displayed in block 234.

The post processing may involve sorting, prioritizing, or other analyzing of the results. In some cases, the results may be analyzed using a heuristic or other mechanism to remove unwanted or redundant text from the classification definition or perform other clean up.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
   receiving an image to classify, said image being located within a text document;
   identifying a plurality of said text documents comprising said image;
   identifying a training set of examples from at least one of said text documents, said training set of examples comprising a subset of text within said text documents;
   training a classifier using said training set;
   classifying said text within said text document using said classifier to identify a group of text associated with said image; and
   for each of said plurality of said text documents, analyzing text in said text documents to determine a list of topics within said text document, said topics being used to select at least a portion of said training set.

2. The method of claim 1, said text documents comprising at least one Hyper Text Markup Language (HTML) document.

3. The method of claim 1 further comprising:
   processing at least one of said text documents to identify a document object model and selecting at least one member of said training set using said document object model, said document object model defining a set of nodes based on objects within said text document.

4. The method of claim 3, said at least one member being selected that is more than a predefined number of nodes from said image.

5. The method of claim 4, said at least one member being a negative example within said training set.

6. The method of claim 3 further comprising:
   identifying a text object that is less than a predefined number of nodes from said image.

7. The method of claim 6, said at least one member being a positive example within said training set.

8. The method of claim 7, said text object being a caption for said image.

9. The method of claim 1 further comprising:
   iterating on said method by performing said training said classifier, and said classifying at least two times.

10. The method of claim 9, said iterating further comprising performing said identifying a training set of examples.

11. A system comprising:
   a computer processor;
   an object classifier operable on said processor, said object classifier that:
      receives a set of text documents and identifies a common object to classify, said common object being comprised in each of said text documents;
      identifies a training set of examples from at least one of said text documents, said training set of examples comprising a subset of text within said text documents;
      trains a classifier using said training set; and
      classifies said text within said text document using said classifier to identify a group of text associated with said object; and
   a document object model generator that processes at least one of said text documents to identify a document object model, said document object model defining a set of nodes based on objects within said text document, said document object model being used to select at least one member of said training set.

12. The system of claim 11, said training set comprising at least one positive example and at least one negative example.

13. The system of claim 12, said at least one positive example comprising a text object related to said object.

14. The system of claim 11, said object classifier that further:
- identifies a plurality of captions for said object from said set of text documents;
- compares said plurality of captions to identify a first caption being an uninteresting caption and removing said first caption from consideration as a positive example for said training set.

15. The system of claim 11, at least some of said text documents being Hyper Text Markup Language (HTML) documents.

16. The system of claim 11, said classifier being a binary classifier that returns a binary result indicating either related or not related.

17. A method performed on at least one computer processor, said method comprising:
- receiving an image to classify, said image being located within a first web page;
- identifying a plurality of web pages comprising said image by transmitting a search request to a search system and returning said plurality of said web pages, the first web page included in said plurality of web pages;
- identifying a training set of examples from at least one of said web pages,
- said training set of examples comprising a subset of text within said plurality of web pages, said training set comprising at least one positive example and at least one negative example;
- training a classifier using said training set, said classifier being a binary classifier that returns a binary result indicating either related or not related;
- classifying said text within said plurality of web pages using said classifier to identify a group of text associated with said image;
- creating a document object model; and
- using said document object model to select at least one member of said training set.

18. The method of claim 17 further comprising:
using said document object model to select said at least one negative example.

19. The method of claim 18 further comprising:
selecting said at least one positive example as a caption for said image.

20. The method of claim 17 further comprising:
for each of said plurality of web pages, analyzing text in said each web page to determine a list of topics within said each web page, said topics being used to select at least a portion of said training set.

* * * * *